US012406317B2

(12) United States Patent
Franke et al.

(10) Patent No.: US 12,406,317 B2
(45) Date of Patent: *Sep. 2, 2025

(54) METHOD AND SYSTEM FOR DECENTRALIZED ENERGY FORECASTING AND SCHEDULING

(71) Applicant: Hitachi Energy Ltd, Zürich (CH)

(72) Inventors: Carsten Franke, Stetten (CH); Thomas Locher, Zürich (CH); Yvonne-Anne Pignolet, Zürich (CH)

(73) Assignee: Hitachi Energy Ltd, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,550

(22) Filed: Jun. 5, 2024

(65) Prior Publication Data

US 2024/0320764 A1    Sep. 26, 2024

Related U.S. Application Data

(63) Continuation of application No. 17/628,093, filed as application No. PCT/EP2020/070353 on Jul. 17, 2020, now Pat. No. 12,026,793.

(30) Foreign Application Priority Data

Jul. 18, 2019 (EP) .................................... 19186919
Nov. 18, 2019 (EP) .................................... 19209869

(51) Int. Cl.
  *G06Q 50/06*    (2024.01)
  *G06Q 10/0631*    (2023.01)
  (Continued)

(52) U.S. Cl.
  CPC ....... *G06Q 50/06* (2013.01); *G06Q 10/06312* (2013.01); *H02J 3/003* (2020.01);
  (Continued)

(58) Field of Classification Search
  None
  See application file for complete search history.

(56) References Cited

U.S. PATENT DOCUMENTS

2011/0173109 A1    7/2011    Synesiou et al.
2017/0285720 A1    10/2017    Sha
2018/0130130 A1    5/2018    Dechu et al.

FOREIGN PATENT DOCUMENTS

DE    102015114215 A1    3/2017

OTHER PUBLICATIONS

International Search Report and Written Opinion of the International Searching Authority for the related International Application No. PCT/EP2020/070353 dated Sep. 29, 2020, 14 pages.
(Continued)

*Primary Examiner* — Stephanie Z Delich
(74) *Attorney, Agent, or Firm* — PROCOPIO, CORY, HARGREAVES & SAVITCH LLP

(57) ABSTRACT

A method for adjusting electrical energy flow schedules of a utility handling a plurality of distributed energy resources. The method comprising the steps of providing information regarding energy flow of the energy resources and storing said information on a distributed ledger; transferring energy schedules from the utility to the distributed ledger; transferring said information regarding the energy flow and the energy schedules from the distributed ledger to a computing means and computing proposed corrections for the energy schedules; transferring said proposed correction to the distributed ledger; transferring said proposed correction to the utility which decides to use or not to use the proposed correction. By deciding to use the proposed correction, the schedules are corrected and information is transferred from the utility to the computing means.

20 Claims, 2 Drawing Sheets

(51) Int. Cl.
    *H02J 3/00*     (2006.01)
    *H02J 3/38*     (2006.01)
(52) U.S. Cl.
    CPC .............. *H02J 3/004* (2020.01); *H02J 3/381* (2013.01); *H02J 2300/20* (2020.01)

(56) References Cited

OTHER PUBLICATIONS

Wang et al., Blockchain-Assisted Crowdsourced Energy Systems, arXiv:1802.03099v2 [cs.SY], Apr. 5, 2018, Published in: 2018 IEEE Power & Energy Society General Meeting (PESGM), DOI: 10.1109/PESGM.2018.8585864, 5 pages.

Ma et al., The Reserve Sharing Mechanism Among Interconnected Power Grids Based on Block Chain, Published in: 2018 15th International Conference on the European Energy Market (EEM), Lodz, Poland, Jun. 27-29, 2018, DOI: 10.1109/EEM.2018.8469967, 5 pages.

Jamil et al., "Peer-to-Peer Energy Trading Mechanism Based on Blockchain and Machine Learning for Sustainable Electrical Power Supply in Smart Grid", IEEE Access, vol. 9, 2021, pp. 39193-39217.

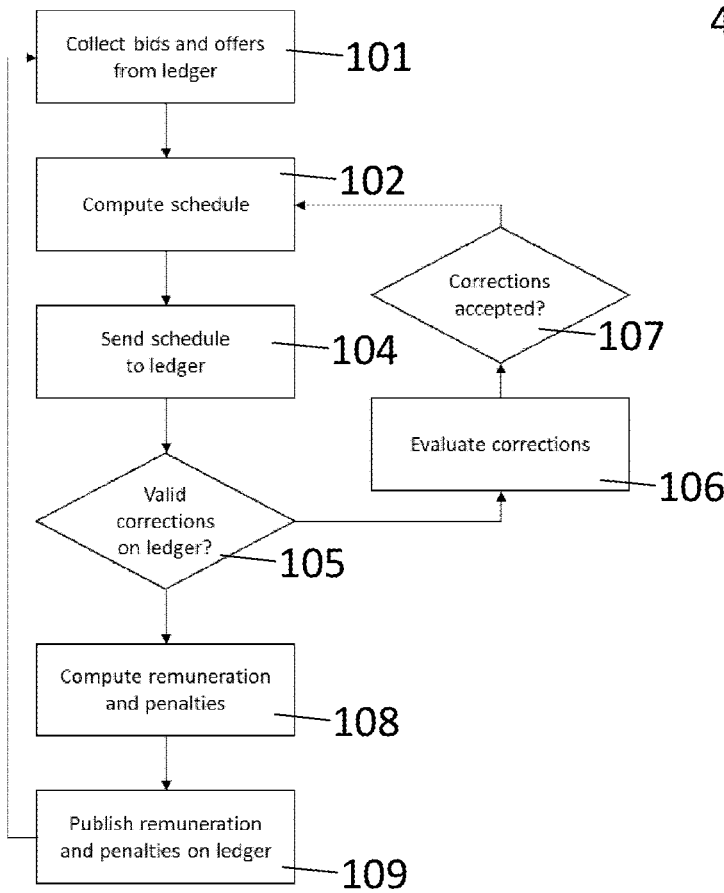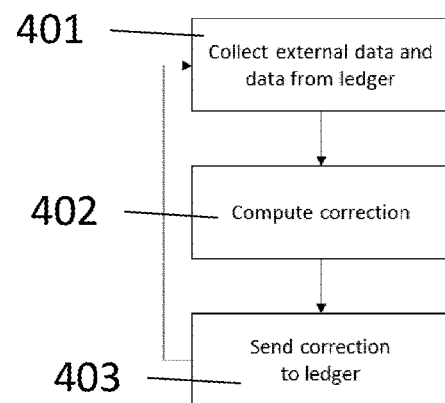
Fig. 2a                    Fig. 2b

METHOD AND SYSTEM FOR DECENTRALIZED ENERGY FORECASTING AND SCHEDULING

CROSS-REFERENCE TO RELATED APPLICATIONS

The present application is a continuation of U.S. patent application Ser. No. 17/628,093, filed on Jan. 18, 2022, which is a national stage entry of International App. No. PCT/EP2020/070353, filed on Jul. 17, 2020, which claims priority to European App. No. 19186919.7, filed on Jul. 18, 2019, and European App. No. 19209869.7, filed on Nov. 18, 2019, which are all hereby incorporated herein by reference as if set forth in full.

FIELD OF THE INVENTION

The present disclosure relates to methods, devices and systems for energy forecasting and scheduling. In particular, the present disclosure provides methods and systems for adjusting electrical energy flow schedules of a utility by using a distributed ledger.

BACKGROUND OF THE INVENTION

Nowadays, a central entity governs the scheduling and also the trading of energy. This entity is either a large utility connected to smaller energy prosumers or a market place that arbitrates between different participants and ensures that the electrical network constraints and the legislative reserves are satisfied.

A schedule defines in which time interval a participant consumes or produces energy. The computation of a suitable schedule takes the demand and/or production schedules from prosumers as input (see e.g., unit commitment problem, UC). Depending on the specific market, the unit commitment problem can be solved in one step or in many iterations in which the market participants participate for different time intervals.

Once a schedule has been found, the central entity informs the participants which then act accordingly. If a participant cannot meet the agreed consumption or production targets, then reserves are used to balance production and/or consumption. In this case, participants and/or additional costs are incurred and environmental damage (e.g., short term usage of gas turbines are often used to provide a large amount of energy at short notice) may be unavoidable. Failure to meet one's targets may additionally result in penalty payments. Failure to meet the target also has technical disadvantages. In case that the energy mismatch cannot be solved within the system, a neighbouring system may be affected as they are electrically connected. Thus, the local problem can become a global problem and be a risk regarding the supply of many customers/people.

The unit commitment problem in electrical power production relates to a large family of optimization problems where the production of a set of electrical generators and/or consumers is coordinated in order to achieve some common target, e.g. to match the energy demand which is often combined with minimizing costs and/or maximizing revenues from energy production.

For instance, coordinating generation units is a difficult technical task for a number of reasons, particularly in case the number of units is large (hundreds or thousands). Typically, there are several types of units with significantly different energy production efficiencies and constraints about how power can be produced. The generation is often distributed across a vast geographical area (e.g., a country), and therefore the response of the electrical grid, itself a highly complex system, has to be taken into account. Even if the production levels of all units are known, checking whether the load can be sustained and what the losses are requires highly complex power flow computations.

It should be emphasized that the UC problem is a clear technical problem, because it is difficult to store electrical energy on a scale comparable with normal consumption; hence, each (substantial) variation in the consumption must be matched by a corresponding variation of the production. Said technical problem is often combined with costs, such that the costs may be considered as an indicator or score for the underlying technical problem.

SUMMARY

It is an objective of the disclosure to provide a method and system that mitigates the above mentioned problems. In particular, it is an object of the present disclosure to provide better input and/or improved information to solve the unit commitment problem.

The object is achieved by the features of the independent claims. Further preferred embodiments are defined in the dependent claims.

The problem of generating better results for the unit commitment problem can be addressed by providing better energy forecasts (production and consumption). Generating precise production and consumption forecasts under different system constraints (electrical grid, consumer facilities, etc.) and/or environmental constraints (e.g. weather, resource costs etc.) is not an easy task and requires experience and computational resources. Especially smaller participants and participants with a high degree of uncertainty (flexible energy consumption and/or numerous renewable energy generators) often do not provide precise schedules. This results in reduced efficiency for the participants, larger required electrical reserves, and potentially less stable electrical grids. Further, additional penalty costs and/or smaller revenues are a consequence for such cases.

In particular, this disclosure addresses the problem by providing a new method/system for improved energy forecasts by enabling at least a new participant—in the following called "worker"—to provide suggestions for better schedules in terms of consumption and/or production for the different participants. In other words, the "worker" provides suggestions for corrections/adjustments for the electrical energy flow schedules. This new worker is preferably provided by any means, e.g., computing or calculating means, which provides the suggestions for improved schedules.

For workers to be able to trust that the central entity properly evaluates their proposed forecasts and schedule corrections and provides appropriate feedback to the worker (s), it is preferred that an immutable audit trail exists. Furthermore, the feedback process to the workers should be automated. Said feedback may comprise technical feedback and/or feedback regarding costs, e.g., a worker may be remunerated for correct forecasts.

The disclosure proposes a novel approach and environment for energy forecasting and scheduling. For instance, the present disclosure may enable utilities to choose among multiple forecasts and/or schedules tailored to their requirements and conditions. Preferably, the disclosure offers automated settlement of schedule corrections/adjustments and evaluation by leveraging smart contracts. Additionally, the automated settlement may also include payments by leveraging the same or additional smart contracts. In particular, a smart contract is preferably a computer program or transaction protocol which is intended to automatically execute, control and/or document legally relevant events and actions according to the terms of a contract or an agreement. The objectives of smart contracts are, for example, the reduction of need in trusted intermediators, arbitrations and enforcement costs, fraud losses, as well as the reduction of malicious and accidental exceptions. According to the present disclosure, the use of smart contracts provides, for example, the advantage that decisions can be handled or executed automatically. For instance, the utility can decide to use or not to use one of the proposed corrections manually or automatically, e.g., by using smart contracts.

The present disclosure provides preferred advantages in that grid capacities and/or reserves can more efficiently or even optimally be used. For instance, the risk of down times of certain participants can be reduced.

"Participant" or "party" according to the present disclosure is the umbrella term for consumers, prosumer (a person or entity with consumes and produces), electrical generator, consumer, etc. . . . The present disclosure can be characterized by the following aspects.

According to a first aspect, a method for adjusting electrical energy flow schedules of a utility is provided. Typically, a utility is handling a plurality of distributed energy resources. The method of the present disclosure preferably adjusts the predictions for energy supply and energy demand schedules. Often, a total energy flow is considered as an entire energy flow handled by a utility, e.g., energy from produces and energy from other utilities or grids etc.

The present disclosure does preferably not address this total energy flow, i.e., the predicted schedules of the total energy flows within the grid, which is often used to identify overloads of lines. In other words, the energy flow of the present disclosure is preferably the energy flow from the sources (produced energy) and to the sinks (consumable energy).

The method comprises the step of providing information regarding energy flow of the energy resources and storing said information on a distributed ledger. The information regarding the energy flow is preferably based on the actual energy flow. Moreover, a schedule or a plurality of schedules are transferred from the utility to the distributed ledger. For instance, actual energy schedule(s) may be transferred to the distributed ledger. Typically, the utility will send the energy schedules to the distributed ledger. It is also possible that the schedules are requests by the utility. Said information regarding the energy flow and the energy schedules from the distributed ledger are then transferred to a computing means, wherein said computing means will compute at least one, preferably a plurality of proposed corrections for said energy schedules. According to the present disclosure, the energy flow is preferably only the flow of energy produced by sources and/or the energy which will or can be consumed by sinks or consumers. Said computing means is the "worker" of the present disclosure. Preferably a plurality of workers, e.g., a plurality of computing means are provided. Preferably, said proposed corrections are transferred to the distributed ledger and preferably store in distributed ledger. Moreover, said proposed corrections are also transferred to the utility, wherein the utility can decide to use or not to use the proposed corrections, e.g., decide to use one or more of from the plurality of corrections. The proposed correction(s) may be transferred from the worker(s) to the distributed ledger and the utility. However, it is preferred that the proposed corrections are transferred to the ledger, preferably stored in said ledger and subsequently transferred from the ledger to the utility. Based on the use of the proposed corrections, the UC problem can be more efficiently solved. In other words, the workers are specialized computing means which can provide corrections which may depend on a plurality of information. The worker(s) may provide this service independently or under the control of a utility. According to a preferred embodiment, independent specialized workers are preferred. These workers may get an incentive by means of tokens or by means of money. Hence, when the utility decides to use the proposed correction(s), the schedules are corrected at the utility and data, information, and/or tokens or even monetary compensation may be transferred from the utility to the computing means (worker).

The distributed energy resources (DERs) preferably comprise producers and/or consumers. In particular, the DERs may comprise multiple generation/contribution and/or storage/consumption components and preferably use at least one renewable energy source from the group consisting of small hydro, biomass, biogas, solar power, wind power and geothermal power. Preferably, the energy resources contribute to a grid of a utility.

According to a further preferred aspect of the disclosure, the proposed corrections are preferably corrections regarding schedules for electrical energy flow from the producers to the utility and/or electrical energy flow from the utility to the consumer.

It is further preferred that external data are used by the computing means (worker), wherein the computing of proposed corrections takes the additional external data into account for the computation of the corrections. Non-limiting examples of external data/information are: Information about public holidays, vacation periods, weekdays, special social events (concerts, sport events), special TV shows/movies, union protests, school vacation information etc. All of this is useful for the right prediction of loads. Furthermore, additional data for renewable energies may be used, e.g. information on the state of turbines in a wind farm (e.g. off/on/out of order).

The distributed ledger is preferably a blockchain. Moreover, it is further preferred that the distributed ledger comprises smart contracts, e.g., for the execution of the steps of an embodiment that can be carried out on the distributed ledger itself. For example, validation of the received corrections and/or schedules and ranking of the received corrections based on their expected performance may be executed by the smart contracts on the distributed ledger.

It is further preferred that the utility automatically decides to use or not to use one or more of the proposed corrections, preferably through a smart contract. Such a decision may be based at least on recent and/or historical data. Preferably, the automatic decision can be done via machine learning. In particular, machine learning is preferably based on computational models and algorithms for classification, clustering, regression and dimensionality reduction, such as neural networks, genetic algorithms, support vector machines, k-means, kernel regression and discriminant analysis. Such computational models and algorithms are preferably "trained" on training data, wherein generating the training set and training the classifier is preferably based on data that may be generated on the basis of simulated data, historical data and/or a combination thereof.

The disclosure also refers to a system which is preferably configured to execute method steps of the present disclosure. The system preferably comprises a distributed ledger which is configured to receive information regarding (actual)

energy flow of the energy resources and (actual) energy flow schedules, e.g. actual energy flow schedules as used or planned by the utility. In particular, the distributed ledger preferably receives information regarding the actually produced energy flow of a plurality of producers and the corresponding energy flow schedules of said produced energy, e.g., actual energy flow schedules as produced by the produces to the utility and/or electrical energy flow from the utility to the consumer. In particular, it preferred to concentrate on specific energy flows from producers and loads. In other words, the total energy flow or the energy flow which is transferred through the entire grid, is typically not monitored in an embodiment.

Said information and schedules are preferably stored on the ledger. A computing means (called worker) is configured to compute proposed corrections for the energy flow schedules on the basis of said information and schedules. The system is further configured to transfer the proposed corrections to said ledger and to store said corrections on the ledger. The utility is further adapted to evaluate/decide either to use or not to use the proposed corrections stored on said ledger. By using the proposed corrections, the (actual) schedules are adjusted or corrected in order to solve the UC problem more efficiently. The utility may be further configured to provide the worker with a feedback, e.g., on the improvement of the efficiency etc. Moreover, the utility may reward the worker for the proposed corrections by means of a general token and/or by money.

Moreover, the disclosure also relates to a computer program comprising instructions to cause the system of the present disclosure to execute the discussed method steps of the present disclosure.

BRIEF DESCRIPTION OF THE DRAWINGS

The subject-matter will be explained in more detail with reference to a preferred exemplary embodiment which is illustrated in the attached drawing:

FIG. 2a a flowchart for utilities; and

FIG. 2b a corresponding flowchart for a worker.

DETAILED DESCRIPTION OF EMBODIMENTS

Figure 1:
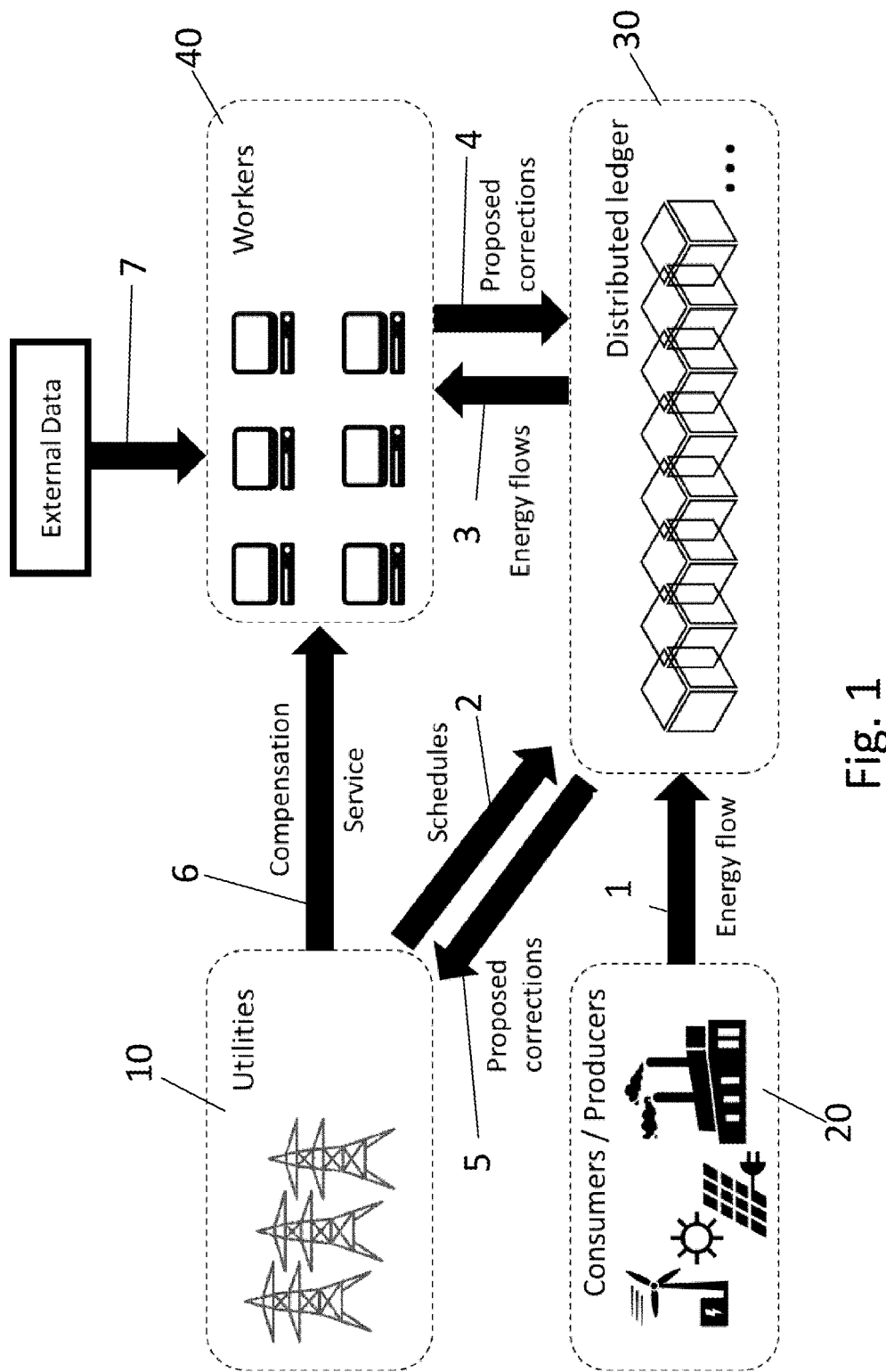
FIG. 1 schematically shows the involved participants and data flow.

An exemplary embodiment will be described with reference to the figures in which identical or similar reference signs designate identical or similar elements.

The main components and parties involved in the proposed system are shown in FIG. 1.

An electric utility 10 is a company in the electric power industry that engages in electricity generation and distribution of electricity. Thus, the utility 10 is managing the power grid operations and preferably also the electricity market, i.e., deciding on the electrical energy flow between the grid and a plurality of distributed energy resources (DER) 20. In particular, the distributed energy resources 20 comprise producers and consumers, wherein these decisions on the electricity market regulate the energy flow from producers to the grid of the utility 10 and energy flow from the grid to consumers. Said electrical energy flow is coordinated with corresponding schedules. Hence, a schedule coordinates when a certain amount of energy is transferred from/to the grid to/from consumers/producers.

The present disclosure provides a new component which is called "worker" 40. In particular, a worker 40 is preferably a computational means, preferably comprising one or a plurality of computational devices that is/are able to calculate and propose forecasts and/or schedule corrections for the energy flow on the basis of certain data. Said corrections may be used by the utility 10 for a more efficient energy flow. In other words, the workers help to solve the unit commitment problem.

Information on available energy produced by the producers, on energy required by consumers and the decision by the utility are generally negotiated on a market place. According to the present disclosure, such a market place uses a distributed ledger 30. In the following example, the market place will be presented as one logical actor for simplicity. However, a plurality of market places are also possible. For instance, according to the present disclosure a plurality of markets are possible and a worker can participate in several of these markets.

According to the present disclosure it is preferred to use a blockchain for the distributed ledger 30. Such a blockchain preferably stores the history of proposed and/or used schedules (unit commitment) with the history of actual flows (see arrow 1 in FIG. 1). In particular said history may be additionally stored together with a set of bids and offers from all participants buying/consuming or selling/producing energy, e.g., the consumers and the producers. Thus, in addition to the technical information of the consuming/producing history of energy, i.e., the flow of energy, also business information regarding buying and selling the energy may be stored in the distributed ledger. A preferred core function of a worker 40 is to analyze past and current energy flows together with additional information (see arrow 3), e.g. weather and/or other forecast data (see arrow 7) and to derive schedule corrections from this data (see arrow 4). Additionally or optionally, a worker 40 may analyze past and current bids in connection with the energy flows and/or said additional information.

A forecast correction or proposed correction would change the amount of energy consumed and/or produced by a set of participants in a certain time interval with a certain probability. Moreover, in addition to said technical features, a bid correction would change the amount of money offered/requested for energy by a (group of) prosumers in a time interval. Thus, a worker 40 proposes a forecast with schedule corrections (unit commitment) that fit the foreseen behavior of the system better. Optionally, said forecast may comprise bids (penalty cost reduction). To this end, workers insert correction proposals into the distributed ledger (see arrow 4).

In order to compute such a correction proposal, the worker 40 can use data from past events (schedules, consumption and optionally bids) stored in the ledger 30 and optionally external data (weather forecast, production forecast, demand forecast, see arrow 7 in FIG. 1). In particular, the worker 40 can use statistical and/or machine learning approaches to compute models of the system. At some later point in time, the value of a correction proposal can be determined retrospectively, i.e., how good the correction proposal matched the real situation. Additionally, the utility 10 could evaluate if the unit commitment problem was solved sufficiently and optionally how much money he would have saved if corrections would have been applied or not. This value can be computed in a number of ways and for different scenarios and time intervals.

Some workers 40 might be better at computing correction proposals for certain time intervals or energy mix scenarios. E.g., some workers might be very good at predicting wind energy in certain regions, other workers achieve higher quality forecasts for solar energy. Furthermore, some workers 40 might generate better seasonal forecasts or may be specialized on time intervals of specific lengths. Thus, corrections can be evaluated in many different ways, taking system properties and constraints into account. This analysis improves the probability to select the right correction suggestions for subsequent time intervals.

The utility 10 can choose among corrections as provided via the distributed ledger 30 to the utility and confirm their use by appending a signed confirmation message to the distributed ledger 30. The utility 10 can base this decision on the quality/gain of proposed corrections in the (recent) past, e.g. the decision may be at least partially based on historical data. In other words, the utility 10 can learn which workers 40 provide good corrections. In particular, it is preferred that learning and automatically deciding is done via machine learning. The generation of the training set and training the machine learning classifier is preferably based on simulated date and/or historical data. Alternatively or additionally, this choice can be automated through a smart contract. In this case, the correction for the next time interval would be selected automatically based on a given formula that evaluates the performance of previously proposed corrections.

The worker 40 that proposed the accepted correction may receive feedback on the level of correctness (see arrow 6), which may be used for further calculations. Additionally, the worker 40 may be rewarded by the utility, by either paying a certain amount to the worker, e.g., in FIAT (Fiat money; see e.g. "https://en.wikipedia.org/wiki/Fiat_money") and/or a virtual currency and/or offering some service, e.g., electricity at a reduced cost. Instead of costs, the reward may be of pure technical nature, e.g., the worker may receive any kind of service from the utility like energy etc.

It is preferred that the actual schedule is stored (see arrow 2) on the ledger 30, such that a smart contract can be used to identify if a proposed correction has been applied and optional rewards and/or penalties may be settled automatically. This preferred mechanism ensures that workers 30 are indeed remunerated if their proposed corrections are used. The rewards can be fixed or depend on the amount of cost reduction achieved by the correction over a time interval. Fixed reward amounts can be set arbitrarily, e.g., computed on the basis of past data as well. These rewards may be considered as incentive that the worker participates in the process which finally helps to improve the grid stability and/or to avoid blackouts. Hence, the prosumers and the utility get a technical benefit. The incentive, however, is not necessarily money but can be more generally provided in form of a token. Based on the tokens the workers collect, services from the utility may be provided to the workers. The cost reductions can stem from lower reserves (legislation requires a certain amount of reserve energy) as with better predictions and unit commitment schedules, reserves can be minimized. Moreover, increased grid availability may reduce costs, which in turn results in lower penalty payments for network down time. The advantage of the present disclosure, however, is also reflected in technical and/or environmental advantages, e.g., the use of fossil energy sources may be reduced as more renewable energy sources can be handled due to more accurate predictions and better unit commitment.

Instead of a correction proposal, the worker 40 could also offer the used computational methods (model) with a smart contract. In this case, the worker 40 could be paid per usage of the model and/or whenever it adjusts the model or its parameters.

FIG. 2a illustrates parts of the method of the present disclosure in a flowchart for a utility 100 and in FIG. 2b parts for a worker 40. In particular, in step 101 the utility collects data regarding the energy flow from the ledger 30, i.e., the amount of electrical energy that is available from the individual participants and how much energy is needed. Additionally, said available and needed energy may be provided by bids and offers, such that the "costs" are an indication of the availability or urgency of the amount of energy. The utility computes a schedule on the basis of said data (step 102) and sends this schedule to the ledger 30 (step 104). In step 105 it is checked whether there exists a proposed correction for the schedule. The proposed correction is evaluated in step 106 and subsequently decided whether this correction is acceptable (step 107). The schedule as previously computed in step 102 is then corrected by the accepted correction(s). Step 108 computes the remuneration and penalties for such an applied correction, wherein said remuneration/penalties are stored and therefore published on the ledger 30 (step 109).

FIG. 2b illustrates parts of the method of the present disclosure in a flowchart for a worker 40. In particular, in step 401 the worker collects external data (see arrow 7 in FIG. 1) and data from the distributed ledger 30 as indicated by arrow 3 in FIG. 1. The worker 40 computes a correction 10 proposal in step 402 and transfers said correction proposal in step 403 to the ledger 30 (see arrow 4 in FIG. 1).

What is claimed is:

1. A method for adjusting electrical energy flow schedules of a utility handling distributed energy resources, the method comprising, by a system of the utility:

storing information regarding historical energy flow of the distributed energy resources in a distributed ledger that provides an immutable audit trail;

generating a proposed schedule for energy flow in a network during a time period by solving a unit commitment problem;

inserting the proposed schedule into the distributed ledger, such that the proposed schedule is accessible to a plurality of workers;

after inserting the proposed schedule into the distributed ledger, automatically analyzing proposed corrections, inserted into the distributed ledger by the plurality of workers, to the proposed schedule, using a machine-learning model that is trained on one or both of simulated data or historical data;

based on the analysis, automatically determining to apply one or more of the proposed corrections, through a smart contract on the distributed ledger;

re-solving the unit commitment problem using the one or more proposed corrections to generate a new proposed schedule for the energy flow in the time period;

causing a transfer of a certain amount of energy between a grid of the utility and one or both of energy consumers or energy producers according to the new proposed schedule;

after the time period, evaluating the proposed corrections, inserted into the distributed ledger by the plurality of workers, to determine a value of each of the proposed corrections based on how well the proposed correction matched reality; and transferring compensation to each of the plurality of workers that inserted one of the one or more proposed corrections into the distributed ledger, wherein the compensation for each one of the one or more proposed corrections is based on the value determined for that one proposed correction.

2. The method of claim 1, wherein the plurality of distributed energy resources comprises a plurality of energy producers.

3. The method of claim 2, wherein at least one of the proposed corrections comprises a change in electrical energy flow from one or more of the plurality of energy producers to the grid of the utility.

4. The method of claim 1, wherein the plurality of distributed energy resources comprises a plurality of energy consumers.

5. The method of claim 4, wherein at least one of the proposed corrections comprises a change in electrical energy flow from the grid of the utility to one or more of the plurality of energy consumers.

6. The method of claim 1, wherein a first one of the proposed corrections, inserted into the distributed ledger by a first one of the plurality of workers, relies on different external data than a second one of the proposed corrections, inserted into the distributed ledger by a second one of the plurality of workers.

7. The method of claim 6, wherein the external data are selected from the group consisting of weather data, information about public holidays, vacation periods, weekdays, social events, TV shows/movies, union protests, school vacation information, and information on the state of turbines in a wind farm.

8. The method of claim 1, wherein the distributed ledger is a blockchain.

9. The method of claim 1, wherein the distributed ledger comprises one or more smart contracts for one or more of validation of the proposed corrections, validation of the proposed schedule, or ranking of the proposed corrections based on expected performance.

10. The method of claim 1, wherein the distributed energy resources comprise one or more energy generation or contribution components.

11. The method of claim 1, wherein the distributed energy resources comprise one or more energy storage or consumption components.

12. The method of claim 1, wherein the distributed energy resources comprise at least one renewable energy source from the group consisting of hydro, biomass, biogas, solar power, wind power, and geothermal power.

13. The method of claim 1, wherein each distributed energy resource contributes to the grid of the utility.

14. The method of claim 1, wherein the system of the utility determines to apply the one or more proposed corrections at least partially based on one or both of recent data or historical data.

15. The method of claim 1, wherein the unit commitment problem optimizes a target while matching units of energy production to units of energy consumption.

16. The method of claim 1, wherein at least one of the plurality of workers operates independently of at least one other one of the plurality of workers.

17. The method of claim 1, wherein the information regarding historical energy flow comprises one or both of previously proposed schedules for energy flow in the network or previously used schedules for energy flow in the network.

18. The method of claim 1, further comprising, by the system of the utility, after determining to apply the one or more proposed corrections, appending a signed confirmation message to the distributed ledger.

19. A system for adjusting electrical energy flow schedules of a utility handling distributed energy resources, the system comprising:

a computer; and
a computer program configured to, when executed by the computer,
store information regarding historical energy flow of the distributed energy resources in a distributed ledger that provides an immutable audit trail,
generate a proposed schedule for energy flow in a network during a time period by solving a unit commitment problem,
insert the proposed schedule into the distributed ledger, such that the proposed schedule is accessible to a plurality of workers,
after inserting the proposed schedule into the distributed ledger, automatically analyze proposed corrections, inserted into the distributed ledger by the plurality of workers, to the proposed schedule, using a machine-learning model that is trained on one or both of simulated data or historical data,
based on the analysis, automatically determine to apply one or more of the proposed corrections, through a smart contract on the distributed ledger,
re-solve the unit commitment problem using the one or more proposed corrections to generate a new proposed schedule for the energy flow in the time period,
cause a transfer of a certain amount of energy between a grid of the utility and one or both of energy consumers or energy producers according to the new proposed schedule,
after the time period, evaluate the proposed corrections, inserted into the distributed ledger by the plurality of workers, to determine a value of each of the proposed corrections based on how well the proposed correction matched reality, and
transfer compensation to each of the plurality of workers that inserted one of the one or more proposed corrections into the distributed ledger, wherein the compensation for each one of the one or more proposed corrections is based on the value determined for that one proposed correction.

20. A non-transitory computer-readable medium having a computer program stored thereon, wherein the computer program, when executed by a computer, causes the computer to:

store information regarding historical energy flow of the distributed energy resources in a distributed ledger that provides an immutable audit trail;
generate a proposed schedule for energy flow in a network during a time period by solving a unit commitment problem;
insert the proposed schedule into the distributed ledger, such that the proposed schedule is accessible to a plurality of workers;
after inserting the proposed schedule into the distributed ledger, automatically analyze proposed corrections, inserted into the distributed ledger by the plurality of workers, to the proposed schedule, using a machine-learning model that is trained on one or both of simulated data or historical data;
based on the analysis, automatically determine to apply one or more of the proposed corrections, through a smart contract on the distributed ledger;
re-solve the unit commitment problem using the one or more proposed corrections to generate a new proposed schedule for the energy flow in the time period;

cause a transfer of a certain amount of energy between a grid of the utility and one or both of energy consumers or energy producers according to the new proposed schedule;

after the time period, evaluate the proposed corrections, inserted into the distributed ledger by the plurality of workers, to determine a value of each of the proposed corrections based on how well the proposed correction matched reality; and transfer compensation to each of the plurality of workers that inserted one of the one or more proposed corrections into the distributed ledger, wherein the compensation for each one of the one or more proposed corrections is based on the value determined for that one proposed correction.

* * * * *